US012255874B2

(12) United States Patent
Burakovsky et al.

(10) Patent No.: US 12,255,874 B2
(45) Date of Patent: *Mar. 18, 2025

(54) SECURING CONTROL AND USER PLANE SEPARATION IN MOBILE NETWORKS

(71) Applicant: Palo Alto Networks, Inc., Santa Clara, CA (US)

(72) Inventors: Leonid Burakovsky, Pleasanton, CA (US); Sachin Verma, Danville, CA (US); Fengliang Hu, Cupertino, CA (US); I-Chun Chen, Santa Clara, CA (US); How Tung Lim, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/314,023

(22) Filed: May 8, 2023

(65) Prior Publication Data

US 2023/0412566 A1    Dec. 21, 2023

Related U.S. Application Data

(63) Continuation of application No. 16/917,490, filed on Jun. 30, 2020, now Pat. No. 11,689,502.

(51) Int. Cl.
*H04L 29/06* (2006.01)
*H04L 9/40* (2022.01)
(Continued)

(52) U.S. Cl.
CPC ...... *H04L 63/0263* (2013.01); *H04L 61/5007* (2022.05); *H04L 63/10* (2013.01);
(Continued)

(58) Field of Classification Search
CPC . H04L 63/0263; H04L 61/5007; H04L 63/10; H04L 63/20; H04W 12/122
See application file for complete search history.

(56) References Cited

U.S. PATENT DOCUMENTS

| 8,973,088 B1 | 3/2015 | Leung |
| 9,438,699 B1 | 9/2016 | Shetty |
| (Continued) | | |

OTHER PUBLICATIONS

3GPP, 3GPP TS 29.244 V16.3.1 [online], pp. 55-58, 70-72, 93, 96-102, 120-122, 143-144, 211, Apr. 2020, [retrieved on Feb. 20, 2024]. Retrieved from the Internet: <URL: https://www.3gpp.org/ftp/Specs/archive/29_series/29.244/29244-g31.zip>.
(Continued)

*Primary Examiner* — Wasika Nipa
(74) *Attorney, Agent, or Firm* — Van Pelt, Yi & James LLP

(57) ABSTRACT

Techniques for securing control and user plane separation in mobile networks (e.g., service provider networks for mobile subscribers, such as for 4G/5G networks) are disclosed. In some embodiments, a system/process/computer program product for securing control and user plane separation in mobile networks in accordance with some embodiments includes monitoring network traffic on a mobile network at a security platform to identify an Packet Forwarding Control Protocol (PFCP) message associated with a new session, in which the mobile network includes a 4G network or a 5G network; extracting a plurality of parameters from the PFCP message at the security platform; and enforcing a security policy at the security platform on the new session based on one or more of the plurality of parameters to secure control and user plane separation in the mobile network.

11 Claims, 12 Drawing Sheets

(51) Int. Cl.
*H04L 61/5007* (2022.01)
*H04W 12/122* (2021.01)
*H04W 24/08* (2009.01)
*H04W 80/02* (2009.01)
*H04W 84/04* (2009.01)

(52) U.S. Cl.
CPC ...... *H04L 63/1458* (2013.01); *H04L 63/1466* (2013.01); *H04L 63/20* (2013.01); *H04W 12/122* (2021.01); *H04W 24/08* (2013.01); *H04L 2463/141* (2013.01); *H04W 80/02* (2013.01); *H04W 84/04* (2013.01)

(56) References Cited

U.S. PATENT DOCUMENTS

| | | | | |
|---|---|---|---|---|
| 10,193,863 | B2 | 1/2019 | Diaz Cuellar | |
| 2015/0095969 | A1* | 4/2015 | Jain | H04L 63/20 726/1 |
| 2019/0089677 | A1 | 3/2019 | Ashley | |
| 2019/0261213 | A1 | 8/2019 | Prasasth | |
| 2019/0335392 | A1 | 10/2019 | Qiao | |
| 2020/0106812 | A1 | 4/2020 | Verma | |
| 2020/0145432 | A1* | 5/2020 | Verma | H04W 12/08 |
| 2021/0136870 | A1* | 5/2021 | Panchal | H04L 67/14 |

OTHER PUBLICATIONS

3GPP, "3rd Generation Partnership Project; Technical Specification Group Core Network and Terminals; Interface between the Control Plane and the User Plane Nodes; Stage 3 (Release 16)" 3GPP Standard; Technical Specification; 3GPP TS 29.244, 3rd Generation Partnership Project (3GPP), Mobile Competence Centre; France, vol. CT WG4, No. V16.3.1, URL: ftp://ftp.3gpp.org/Specs/archive/29_series/29.244/29244-g31.zip 29244-g31.docx, Part 1: 1-146 Pages.
3GPP, "3rd Generation Partnership Project; Technical Specification Group Core Network and Terminals; Interface between the Control Plane and the User Plane Nodes; Stage 3 (Release 16)" 3GPP Standard; Technical Specification; 3GPP TS 29.244, 3rd Generation Partnership Project (3GPP), Mobile Competence Centre; France, vol. CT WG4, No. V16.3.1, URL: ftp://ftp.3gpp.org/Specs/archive/29_series/29.244/29244-g31.zip 29244-g31.docx, Part 2: 147-297 Pages.
3GPP, 3GPP TS 23.501 V16.4.0 (Mar. 2020), Technical Specification, 3rd Generation Partnership Project; Technical Specification Group Services and System Aspects; System architecture for the 5G System (5GS);Stage 2, (Release 16).
3GPP, 3GPP TS 29.244 V15.7.0 (Sep. 2019), 3rd Generation Partnership Project; Technical Specification Group Core Network and Terminals; Interface between the Control Plane and the User Plane Nodes; Stage 3 (Release 15).
3GPP, 3GPP TS 29.274 V15.3.0 (Mar. 2018), 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15).
3GPP, 3GPP TS 29.281 V15.4.0 (Sep. 2018), 3rd Generation Partnership Project; Technical Specification Group Core Network and Terminals; General Packet Radio System (GPRS) Tunnelling Protocol User Plane (GTPv1-U) (Release 15).

* cited by examiner

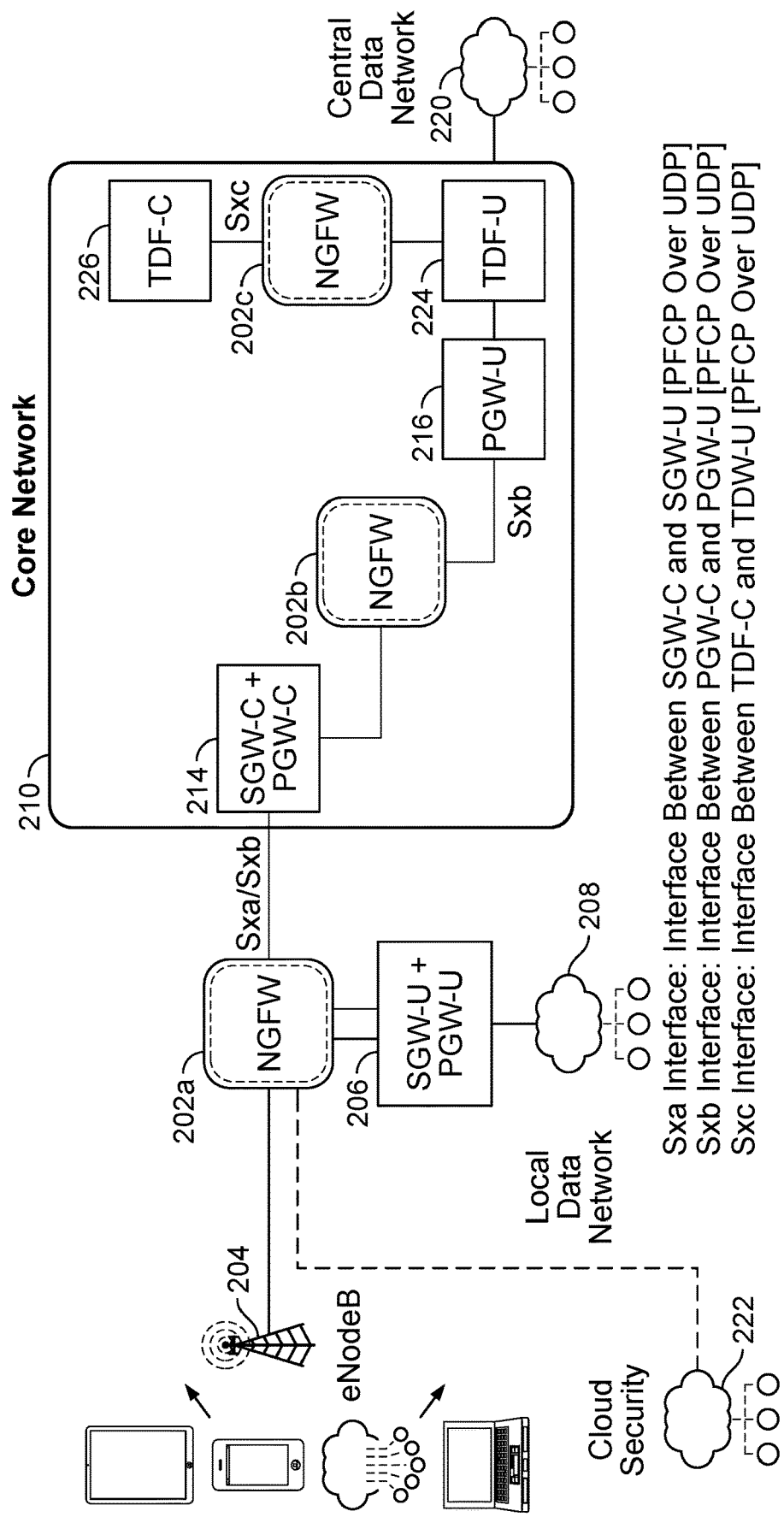

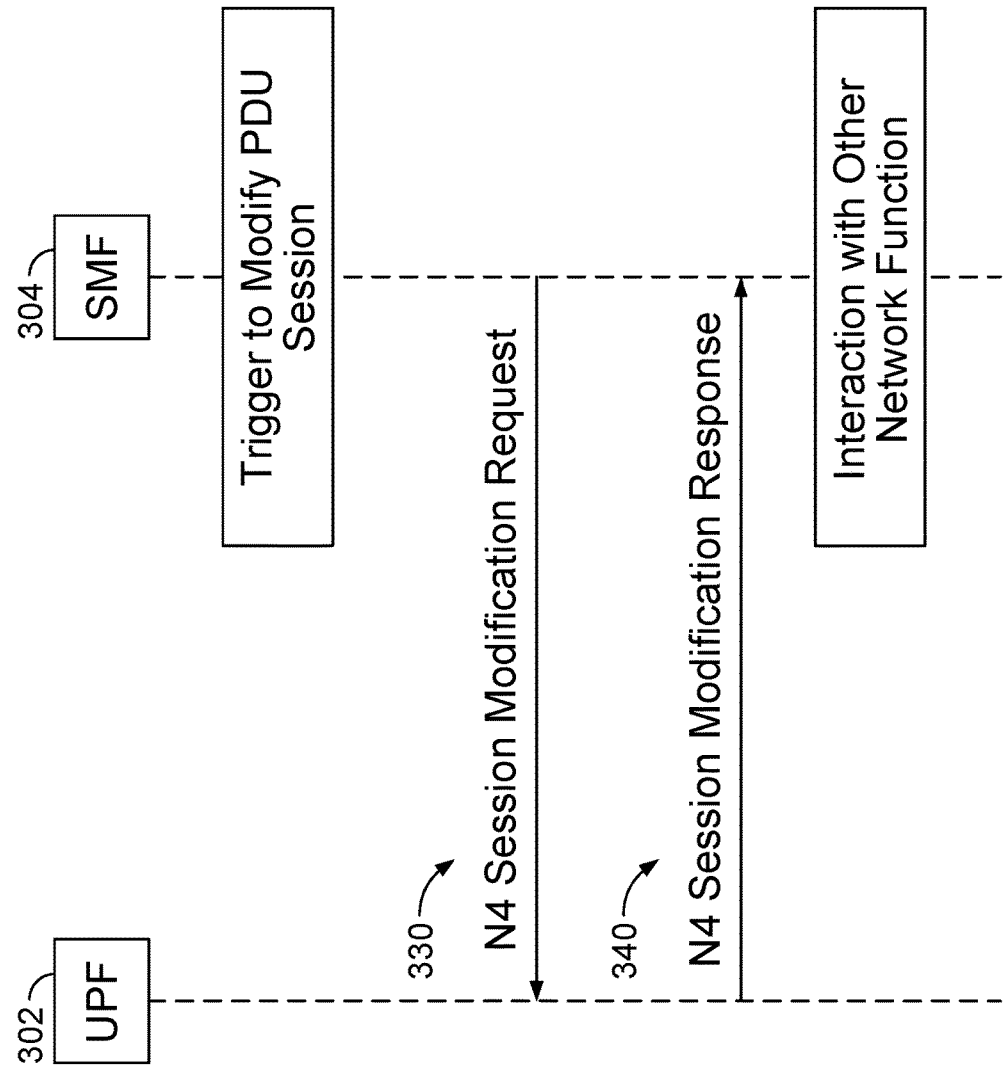

SECURING CONTROL AND USER PLANE SEPARATION IN MOBILE NETWORKS

CROSS REFERENCE TO OTHER APPLICATIONS

This application is a continuation of U.S. patent application Ser. No. 16/917,490, entitled SECURING CONTROL AND USER PLANE SEPARATION IN MOBILE NETWORKS filed Jun. 30, 2020 which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 2B is another block diagram of an architecture of a 4G wireless network with a security platform for securing control and user plane separation in mobile networks in accordance with some embodiments.

FIG. 3B is a protocol sequence diagram for a PFCP session modification procedure.

DETAILED DESCRIPTION

Figure 1:
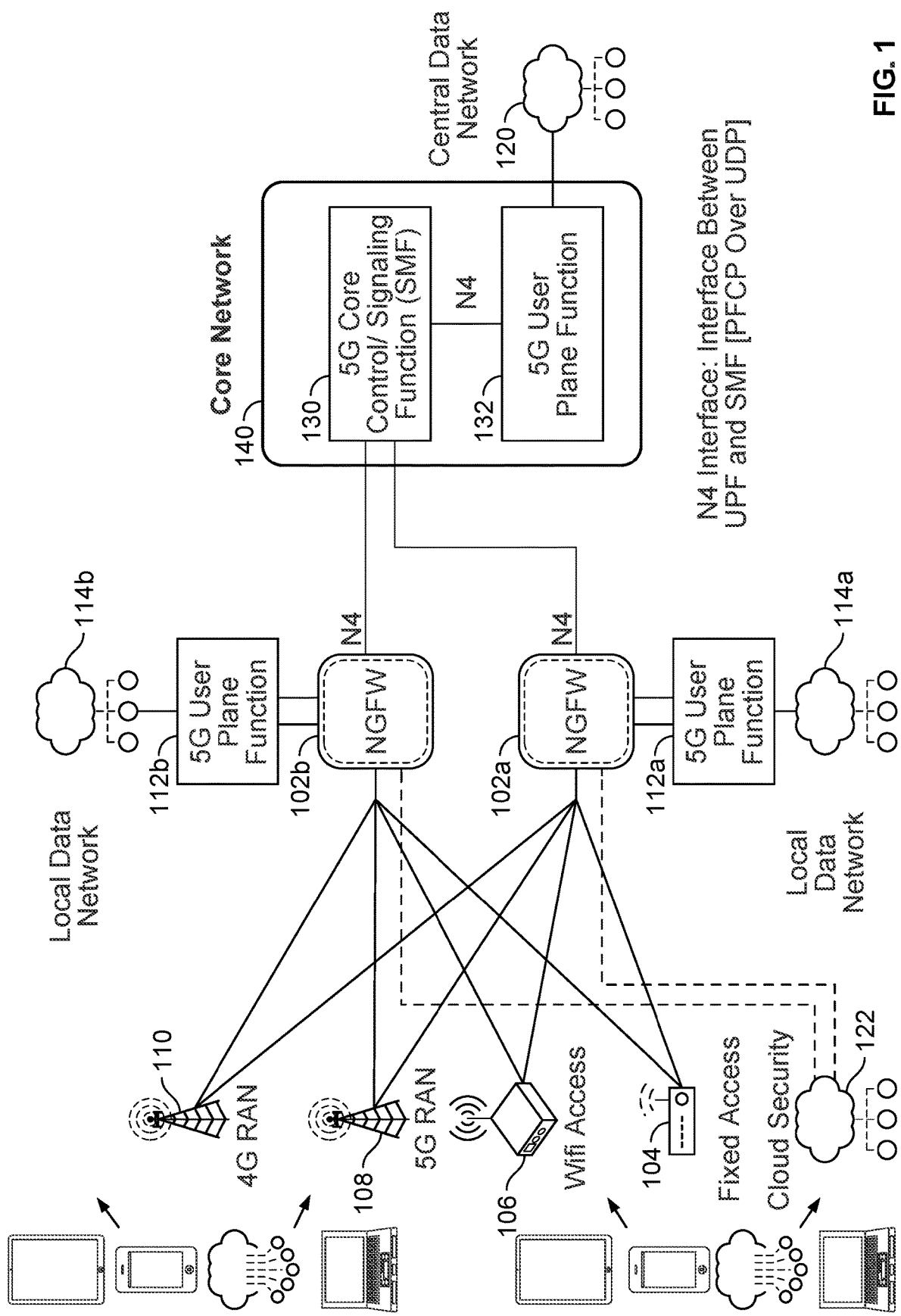
FIG. 1 is a block diagram of an architecture of a 5G wireless network with a security platform for securing control and user plane separation in mobile networks in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls and Palo Alto Networks' VM Series virtualized next generation firewalls).

For example, Palo Alto Networks' next generation firewalls enable enterprises and service providers to identify and control applications, users, and content—not just ports, IP addresses, and packets—using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Technical and Security Challenges in Today's Mobile Networks for Service Providers Converged (Mobile and Fixed) Network Operators worldwide are now in the process of deploying standalone 5G mobile network technology. In 5G mobile networks, enterprise customers will be offered connectivity using Control and User Plane Separation (CUPS). As such, it will be important to secure and validate the communication between the control network functions in 5G mobile networks (e.g., a Session Management Function(s) (SMF) located in a central packet core/cloud packet core and a User Plane Function(s) (UPF) located on a customer premise/access site/distribution site).

Thus, technical and security challenges with service provider networks exist for devices in mobile networks. As such, what are needed are new and improved security techniques for devices in such service provider network environments (e.g., mobile networks). Specifically, what are needed are new and improved solutions for monitoring such network traffic and applying security policies (e.g., firewall policies) for devices communicating on service provider networks.

Overview of Techniques for Securing Control and User Plane Separation in Mobile Networks Technical and security challenges with service provider networks exist for securing control and user plane separation in mobile networks. Specifically, what are needed are new and improved techniques for securing control and user plane separation in mobile network environments (e.g., 4G and/or 5G mobile networks). More specifically, new and improved solutions for monitoring mobile network traffic and applying security policies (e.g., security/firewall policies) for securing control and user plane separation in mobile networks are needed.

As will be further described below, PFCP is a 3GPP protocol that is used on Sx/N4 interfaces between the control plane and the user plane function (e.g., specified in 3GPP Technical Specification (TS) 29.244 v15.7 for the LTE; 5G; Interface between the Control Plane and the User Plane nodes (e.g., and later releases/versions)).

In some embodiments, new and improved techniques for Packet Forwarding Control Protocol (PFCP) stateful inspection for securing control and user plane separation in mobile networks that can be performed by a security platform are disclosed as will be further described below.

For example, new and improved techniques for PFCP stateful inspection for securing control and user plane separation in mobile networks can be performed by a security platform in a 5G technology based mobile network (e.g., 5G mobile network) by parsing PFCP messages over an N4 interface between a Session Management Function (SMF) and a User Plane Function (UPF) to extract certain information used to setup PFCF sessions and to keep track of control message flow.

As another example, new and improved techniques for PFCP stateful inspection for securing control and user plane separation in mobile networks can be performed by a security platform in a 4G technology based mobile network (e.g., 4G mobile network) by parsing PFCP messages over an Sxa interface between a Serving Gateway (SG)-C and an SG-U, an Sxb interface between a Packet Data Network (PDN) Gateway-C and a PDN Gateway-U, and an Sxc interface between a Traffic Detection Function (TDF)-C and a TDF-U to extract certain information used to setup PFCF sessions and to keep track of control message flow.

Accordingly, new and improved security solutions that facilitate applying security (e.g., network-based security) using a security platform (e.g., a firewall (FW)/Next Generation Firewall (NGFW), a network sensor acting on behalf of the firewall, or another (virtual) device/component that can implement security policies using the disclosed techniques) in a mobile network (e.g., a 4G/5G mobile network) on PFCP traffic are disclosed in accordance with some embodiments. For example, the disclosed techniques for securing control and user plane separation in mobile networks can provide identification and prevention of attacks including Denial of Service (DoS), Session Endpoint Identifier (SEID) Spoofing, and SEID guessing over Packet Forwarding Control Protocol (PFCP) at various 4G/5G network locations including a local area data network, a core network, a multi-access distributed edge location, an enterprise network with a local User Plane Function (UPF), and/or various other 4G/5G network locations.

As further described below, various techniques for securing control and user plane separation in mobile networks are disclosed. In some embodiments, a system/process/computer program product for securing control and user plane separation in mobile networks in accordance with some embodiments includes monitoring network traffic on a mobile network at a security platform to identify a Packet Forwarding Control Protocol (PFCP) message associated with a new session, in which the mobile network includes a 4G network or a 5G network; extracting a plurality of parameters (e.g., a 5-tuple+Node ID (optional) related to a PFCP association as will be further described below) from the PFCP message at the security platform; and enforcing a security policy at the security platform on the new session based on one or more of the plurality of parameters to secure control and user plane separation in the mobile network.

For example, the security platform can parse the PFCP message to extract the following parameters: a source IP address, SEID 1, a destination IP address, SEID 2, and the protocol in use related to a PFCP association. As another example, the security platform can parse the PFCP message to extract a Node ID related to a PFCP association.

In an example implementation, the security platform is configured with a security policy to perform detection and prevention of Denial of Service (DoS) attacks for securing control and user plane separation in the mobile network.

In another example implementation, the security platform is configured with a security policy to perform detection and prevention of Session Endpoint Identifier (SEID) Spoofing attacks for securing control and user plane separation in the mobile network.

The disclosed techniques for securing control and user plane separation in mobile networks can be applied to facilitate various secured mobile network solutions. As an example, mobile Network Operators can use the disclosed techniques to secure communication between cloud-based control infrastructure and distributed edge location. As another example, enterprise customers with private 4G/5G connectivity can use the disclosed techniques to secure communication between a local User Plane Function (UPF) and a cloud-based control infrastructure.

These and other embodiments and examples for securing control and user plane separation in mobile networks will be further described below.

Example System Architectures for Securing Control and User Plane Separation in Mobile Networks Generally, 5G is the $5^{th}$ generation of the mobile communications system. The 3rd Generation Partnership Project (3GPP) includes seven telecommunications standard development organizations (i.e., ARIB, ATIS, CCSA, ETSI, TSDSI, TTA, and TTC). The project covers cellular telecommunications network technologies, including radio access, the core transport network, and service capabilities. The specifications also provide hooks for non-radio access to the core network, and for interworking with Wi-Fi networks and other organizations including ITU, IETF, and ETSI that are developing 5G standards. Some of the improvements of the new 5G network standards include, for example, multi-edge computing, low latency (e.g., approximately less than 10 milliseconds (MS)), high throughput (e.g., multi-Gbps), distribution, network function virtualization infrastructure, as well as orchestration, analytics, and automation.

The 5G architecture is defined in 3GPP TS 23.501 v16.4.0 (e.g., available at https://portal.3gpp.org/desktopmodules/Specifications/SpecificationDetails.aspx?specificationId=3144) (e.g., and later releases/versions) as service-based, and the interaction between Network Functions (NFs) is represented in two ways: (1) service-based representation, where NFs within the Control Plane (CP) enable other authorized network functions to access their services; and (2) reference point representation, focuses on the interactions between pairs of NFs defined by point-to-point reference points between any two network functions.

In the 5G architecture, the User Plane Protocol stack between the access network and the core over the backbone network over the N3 interface (e.g., between a Radio Access Network (RAN) and a UPF element) will be based on the GPRS Tunnel Protocol User Plane (GTP-U) over UDP protocol, and also over the N4 interface (e.g., between a UPF element and SMF element) will be based on the Packet Forwarding Control Protocol (PFCP) over UDP protocol. The Control Plane NFs in the 5G system architecture shall be based on the service-based architecture. HTTP/2 will be the protocol used over service-based interfaces. A new 5G Access Network protocol will be based over Stream Control Transmission Protocol (SCTP).

Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, such as PANOS executing on a virtual/physical NGFW solution commercially available from Palo Alto Networks, Inc. or another security platform/ NFGW) configured to provide DPI capabilities (e.g., including stateful inspection) of, for example, GTP-U sessions and new HTTP/2 based TCP sessions that facilitate a correlation between monitored GTP-U tunnel sessions and new HTTP/2 based TCP sessions as further described below, and as another example, correlation between monitored GTP-U tunnels (e.g., on the N3 interface) and PFCP sessions (e.g., on the N4/Sx interfaces).

In some embodiments, a security platform is configured to provide the following DPI capabilities: stateful inspection of N3 GTP-U tunnels and/or N4 GTP-U tunnels; content inspection of N3 GTP-U tunnels (e.g., to inspect content of inner IP sessions of N3 GTP-U tunnels) and/or N4/Sx PFCP sessions (e.g., to inspect content of N4/Sx PFCP sessions); support for 3GPP Technical Specification (TS) 29.274 v15.3.0 Release 15 (e.g., and later releases/versions) for Procedures for the 5G system to support 5G cellular technology; and support for 3GPP Technical Specification (TS) 29.281 v15.4.0 Release 14 (e.g., and later releases/versions) for GTP-U protocol.

FIG. 1 is a block diagram of an architecture of a 5G wireless network with a security platform for securing control and user plane separation in mobile networks in accordance with some embodiments. Specifically, FIG. 1 is an example 5G mobile network environment for securing control and user plane separation in mobile networks that includes Security Platforms 102a and 102b (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques) for securing control and user plane separation as further described below. As shown, the 5G mobile network environment can also include Fixed/ Wired access as shown at 104, Non-3GPP access such as Wi-Fi Access as shown at 106, 5G Radio Access Network (RAN) access as shown at 108, 4G RAN access as shown at 110, and/or other networks (not shown in FIG. 1) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) including over a Central Data Network (e.g., the Internet) 120 to access various applications, web services, content hosts, etc. and/or other networks. As shown in FIG. 1, each of the 5G network access mechanisms 104, 106, 108, and 110 are in communication (e.g., via an S1-U interface) with 5G User Plane Functions 112a and 112b, which pass through Security Platforms 102a and 102b to communicate with 5G User Plane Functions 112a and 112b, respectively.

As also shown in FIG. 1, the N4 interfaces as shown each provide an interface between UPFs 112a/b and 5G Core Control/Signaling Functions including a Session Management Function (SMF) 130 via PFCP over UDP. Core Network 140 includes SMF 130, which is in communication with a 5G User Plane Function 132, which is in communication with a Central Data Network 120.

Referring to FIG. 1, network traffic communications are monitored using Security Platforms 102a and 102b. As shown, network traffic communications are monitored/filtered in the 5G network using Security Platforms 102a and 102b (e.g., (virtual) devices/appliances that each include a firewall (FW), a network sensor acting on behalf of the firewall, or another device/component that can implement security policies using the disclosed techniques) configured to perform the disclosed techniques for securing control and user plane separation in mobile networks as similarly described above and as further described below.

In addition, Security Platforms 102a and 102b can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Referring to FIG. 1, Security Platforms 102a and 102b perform PFCP stateful inspection in this example 5G mobile network environment by parsing PFCP messages (e.g., PFCP over UDP) on the N4 interfaces between UPFs 112a and 112b and SMF 130, respectively, to extract certain information used to setup PFCF sessions and to keep track of control message flow as will be further described below.

As will now be apparent, network traffic communications can be monitored/filtered using one or more security platforms for network traffic communications in various locations within the 5G network (e.g., 5G network or converged 5G network) to facilitate securing control and user plane separation in mobile networks.

Figure 2A:
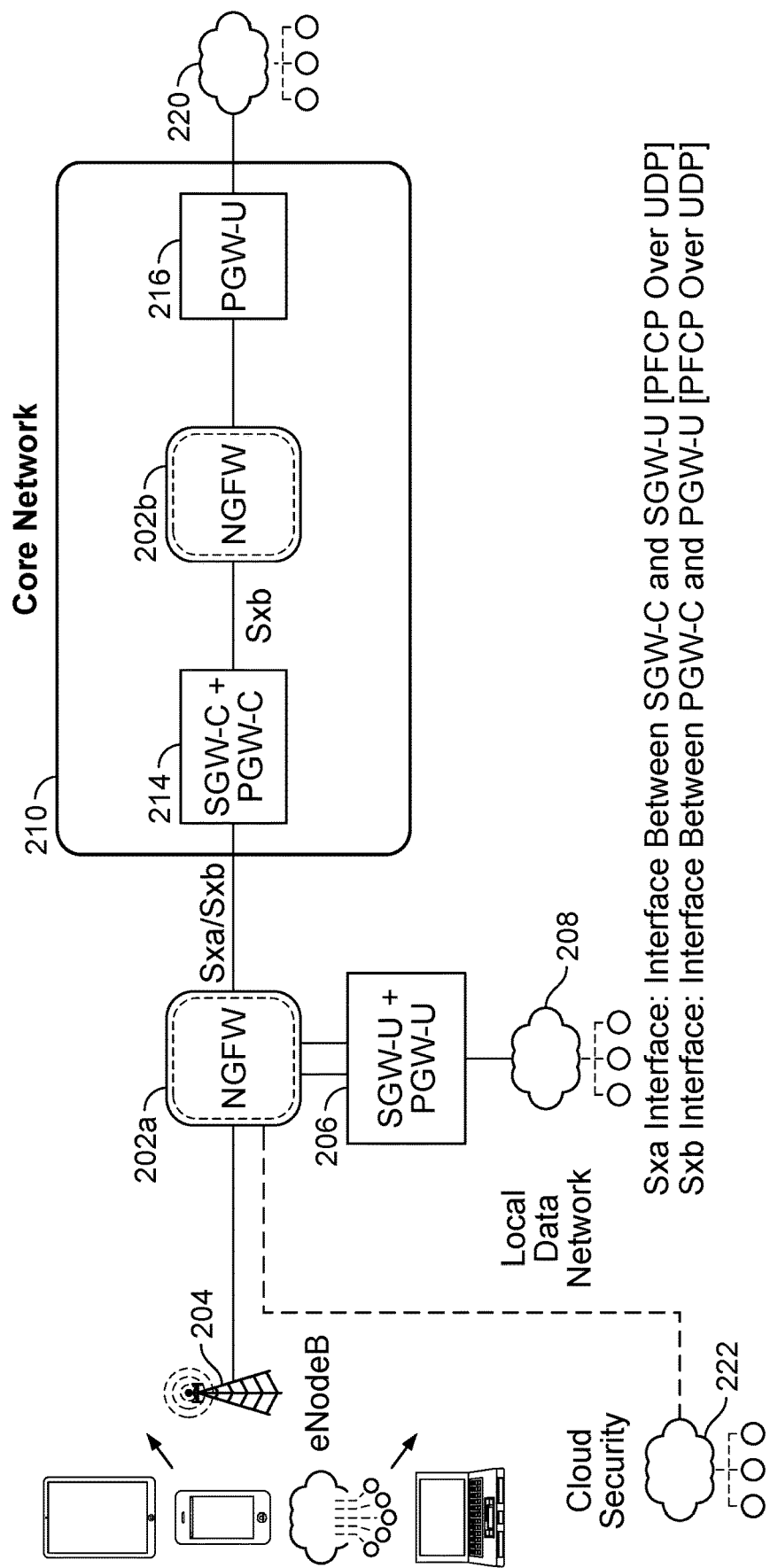
FIG. 2A is a block diagram of an architecture of a 4G wireless network with a security platform for securing control and user plane separation in mobile networks in accordance with some embodiments.

FIG. 2A is a block diagram of an architecture of a 4G wireless network with a security platform for securing control and user plane separation in mobile networks in accordance with some embodiments. Specifically, FIG. 2A is an example 4G mobile network environment for securing control and user plane separation in mobile networks that includes Security Platforms 202a and 202b (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques) for securing control and user plane separation as further described below. The 4G mobile network environment can also include Fixed/Wired access (not shown in FIG. 2A), Non-3GPP access such as Wi-Fi Access (not shown in FIG. 2A), 4G Radio Access Network (RAN) access as shown at 204, and/or other networks (not shown in FIG. 2A) to facilitate data communications for subscribers (e.g., using User Equipment (UE), such as smart phones, laptops, computers (which may be in a fixed location), and/or other cellular enabled computing devices/ equipment, such as CIoT devices, or other network communication enabled devices) including over a Central Data Network (e.g., the Internet) 220 to access various applications, web services, content hosts, etc., and/or other networks.

As shown in FIG. 2A, the 4G network access mechanisms eNodeB 204 are in communication with User Plane network elements including a combined Serving Gateway (SGW) and a Packet Gateway (PGW) for the User Plane traffic shown as SGW-U+PGW-U 206, which passes through Security Platform 202a to communicate with SGW-U+PGW-U 206.

As also shown in FIG. 2A, Core Network 210 includes Control Plane network elements including a combined Serving Gateway (SGW) and a Packet Data Network (PDN) Gateway (PGW) for the Control Plane traffic shown as SGW-C+PGW-C 214, which passes through Security Platform 202b to communicate with a PGW-U 216. Core Network 210 includes PGW-U 216 for User Plane traffic to facilitate access to Central Data Network 220. Specifically, the Sxa interface provides an interface between SGW-C 214 and SGW-U 206 via PFCP over UDP, and the Sxb interface provides an interface between PGW-C 214 and PGW-U 216 via PFCP over UDP.

As also shown, Security Platform 202a (e.g., and other Security Platforms can similarly be in communication with the security cloud service) is also in network communication with a security service 222 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as for dynamic prevention signatures for malware, DNS, URL, command and control (C&C), and/or various other security updates and/or cloud-based malware samples analysis.

Referring to FIG. 2A, network traffic communications can be monitored using Security Platforms 202a and 202b (e.g., which can be located in various locations to monitor Sxa, Sxb, and/or other communications) as similarly described above with respect to FIG. 1 and as further described below. In this example implementation, Security Platforms 202a and 202b are located in this example 4G mobile network environment for monitoring and parsing PFCP messages (e.g., PFCP over UDP) on an Sxa interface between Serving Gateway-C shown at 214 and Serving Gateway-U shown at 206 and an Sxb interface between PDN Gateway-C shown at 214 and PDN Gateway-U shown at 216 to extract certain information used to setup PFCF sessions and to keep track of control message flow as will be further described below.

FIG. 2B is another block diagram of an architecture of a 4G wireless network with a security platform for securing control and user plane separation in mobile networks in accordance with some embodiments. Specifically, FIG. 2B is an example 4G mobile network environment for securing control and user plane separation in mobile networks that includes Security Platforms 202a, 202b, and 202c (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques) for securing control and user plane separation as further described below. The 4G mobile network environment can also include Fixed/Wired access (not shown in FIG. 2B), Non-3GPP access such as Wi-Fi Access (not shown in FIG. 2B), 4G Radio Access Network (RAN) access as shown at 204, and/or other networks (not shown in FIG. 2B) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) including over a Central Data Network (e.g., the Internet) 220 to access various applications, web services, content hosts, etc. and/or other networks.

As shown in FIG. 2B, the 4G network access mechanisms 204 are in communication with combined User Plane network elements including a Serving Gateway (SGW) and a Packet Gateway (PGW) for the User Plane traffic shown as SGW-U+PGW-U 206, which passes through Security Platform 202a to communicate with SGW-U+PGW-U 206.

As also shown in FIG. 2B, the 4G network access mechanisms 204 are in communication (e.g., via an Sxa/Sxb interface) with a Core Network 210, which passes through Security Platform 202a to access Core Network 210. Core Network 210 includes combined Control Plane network elements including a Serving Gateway (SGW) and a Packet Data Network (PDN) Gateway (PGW) for the Control Plane traffic shown as SGW-C+PGW-C 214. Core Network 210 also includes a PGW-U 216 for User Plane traffic to facilitate access to Central Data Network 220, which passes through Security Platform 202b to access Central Data Network 220 via PGW-U 216 and a Traffic Detection Function (TDF) for User Plane Traffic shown as TDF-U 224. Specifically, the Sxa interface provides an interface between SGW-C 214 and SGW-U 206 via PFCP over UDP, and the Sxb interface provides an interface between PGW-C 214 and PGW-U 216 via PFCP over UDP. Core Network 210 also includes a Traffic Detection Function (TDF) for Control Plane Traffic shown as TDF-C 226, and network traffic over the Sxc interface between TDF-C 226 and TDF-U 224 passes through Security Platform 202c.

As also shown, Security Platform 202a (e.g., and other Security Platforms can similarly be in communication with the security cloud service) is also in network communication with a security service 222 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as for dynamic prevention signatures for malware, DNS, URL, command and control (C&C), and/or various other security updates and/or cloud-based malware samples analysis.

Referring to FIG. 2B, network traffic communications can be monitored using Security Platforms 202a, 202b, and 202c (e.g., which can be located in various locations to monitor Sxa, Sxb, Sxc, and/or other communications) as similarly described above with respect to FIG. 2A and as further described below. In this example implementation, Security Platforms 202a, 202b, and 202c are located in this example 4G mobile network environment for monitoring and parsing PFCP messages (e.g., PFCP over UDP) on an Sxa interface between Serving Gateway-C shown at 214 and Serving Gateway-U shown at 206, an Sxb interface between PDN Gateway-C shown at 214 and PDN Gateway-U shown at 206, and an Sxc interface between TDF-C as shown at 226 and TDF-U as shown at 224 to extract certain information used to setup PFCF sessions and to keep track of control message flow as will be further described below.

Figure 2C:
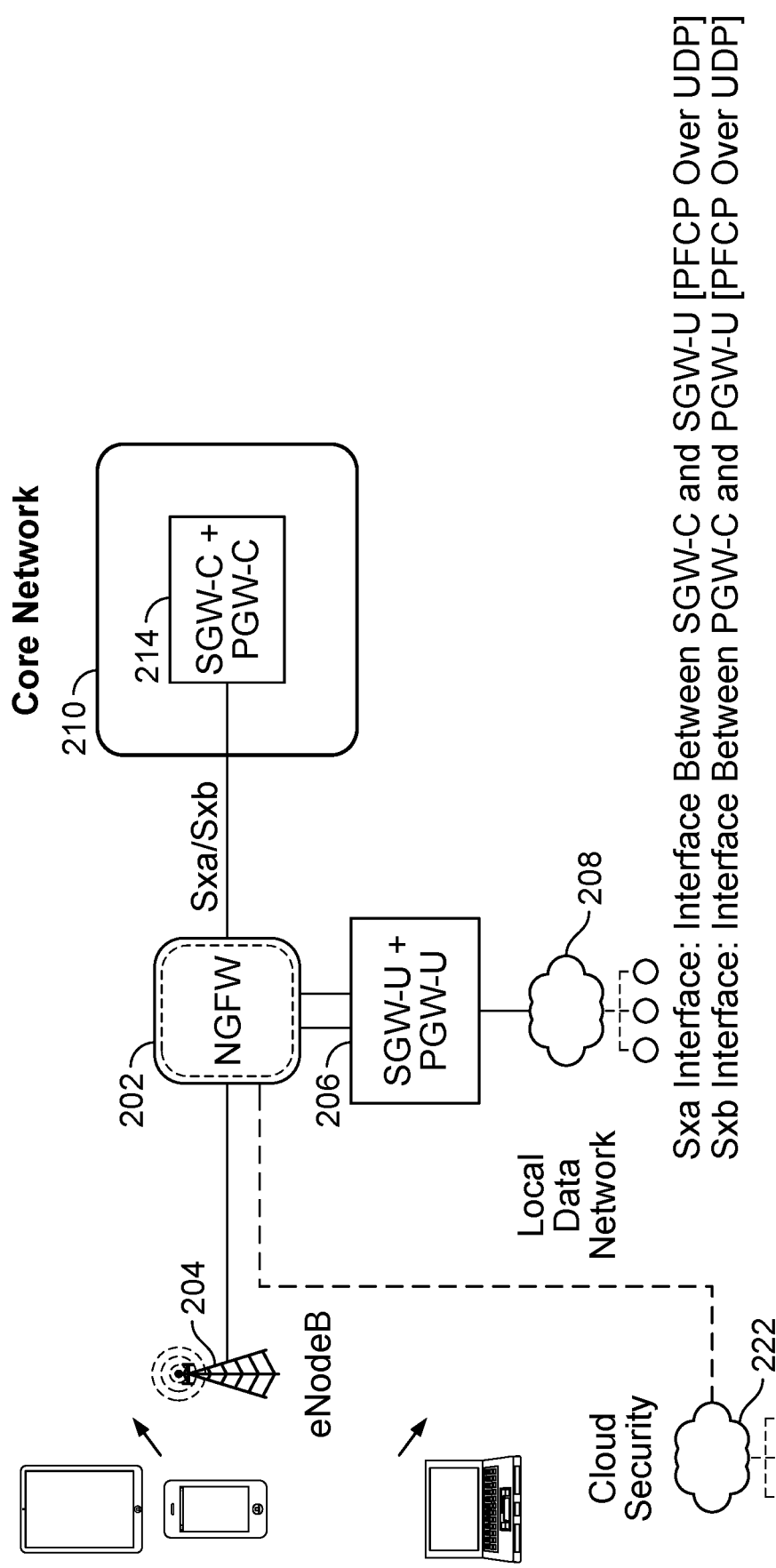
FIG. 2C is another block diagram of an architecture of a 4G wireless network with a security platform for securing control and user plane separation in mobile networks in accordance with some embodiments.

FIG. 2C is another block diagram of an architecture of a 4G wireless network with a security platform for securing control and user plane separation in mobile networks in accordance with some embodiments. Specifically, FIG. 2C is an example 4G mobile network environment for securing control and user plane separation in mobile networks that includes a Security Platform 202 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques) for securing control and user plane separation as further described below. The 4G mobile network environment can also include Fixed/Wired access (not shown in FIG. 2C), Non-3GPP access such as Wi-Fi Access (not shown in FIG. 2C), 4G Radio Access Network (RAN) access as shown at 204, and/or other networks (not shown in FIG. 2C) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) to access various applications, web services, content hosts, etc. and/or other networks.

As shown in FIG. 2C, the 4G network access mechanisms 204 are in communication with combined User Plane network elements including a Serving Gateway (SGW) and a Packet Gateway (PGW) for the User Plane traffic shown as SGW-U+PGW-U 206, which passes through Security Platform 202 to communicate with SGW-U+PGW-U 206.

As also shown in FIG. 2C, the 4G network access mechanisms 204 are in communication (e.g., via an Sxa/Sxb interface) with a Core Network 210, which passes through Security Platform 202 to access Core Network 210. Core Network 210 includes combined Control Plane network elements including a Serving Gateway (SGW) and a Packet Data Network (PDN) Gateway (PGW) for the Control Plane traffic shown as SGW-C+PGW-C 214. Specifically, the Sxa interface provides an interface between SGW-C 214 and SGW-U 206 via PFCP over UDP, and the Sxb interface provides an interface between PGW-C 214 and PGW-U 206 via PFCP over UDP.

As also shown, Security Platform 202 is also in network communication with a security service 222 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as for dynamic prevention signatures for malware, DNS, URL, command and control (C&C), and/or various other security updates and/or cloud-based malware samples analysis.

Referring to FIG. 2C, network traffic communications can be monitored using Security Platform 202 (e.g., which can be located in various locations to monitor Sxa, Sxb, and/or other communications) as similarly described above with respect to FIGS. 2A-B and as further described below. In this example implementation, Security Platform 202 is located in this example 4G mobile network environment for monitoring and parsing PFCP messages (e.g., PFCP over UDP) on an Sxa interface between Serving Gateway-C shown at 214 and Serving Gateway-U shown at 206 and an Sxb interface between PDN Gateway-C shown at 214 and PDN Gateway-U shown at 206 to extract certain information used to setup PFCF sessions and to keep track of control message flow as will be further described below.

Figure 2D:
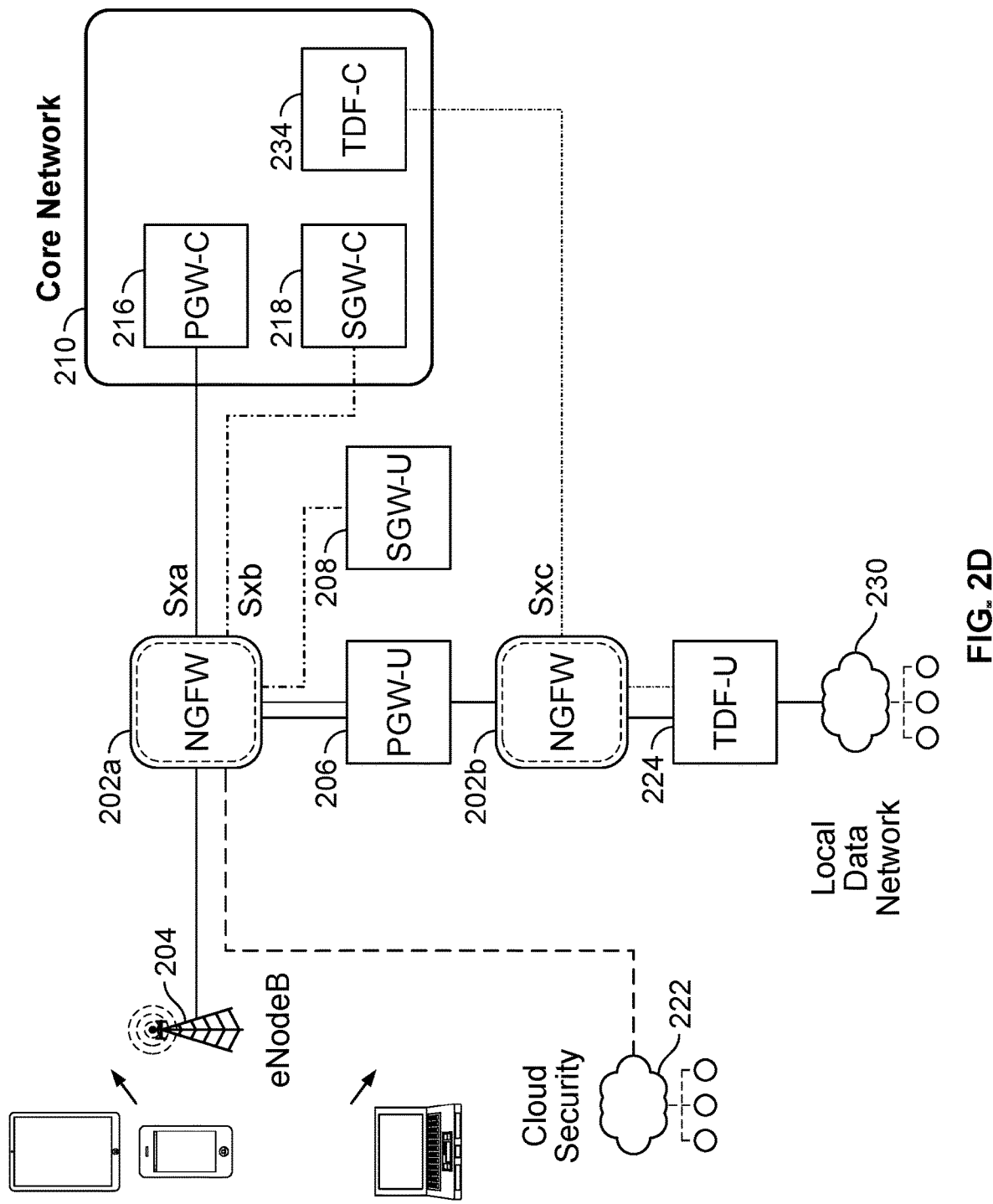
FIG. 2D is another block diagram of an architecture of a 4G wireless network with a security platform for securing control and user plane separation in mobile networks in accordance with some embodiments.

FIG. 2D is another block diagram of an architecture of a 4G wireless network with a security platform for securing control and user plane separation in mobile networks in accordance with some embodiments. Specifically, FIG. 2D is an example 4G mobile network environment for securing control and user plane separation in mobile networks that includes Security Platforms 202a and 202b (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques) for securing control and user plane separation as further described below. The 4G mobile network environment can also include Fixed/Wired access (not shown in FIG. 2D), Non-3GPP access such as Wi-Fi Access (not shown in FIG. 2D), 4G Radio Access Network (RAN) access as shown at 204, and/or other networks (not shown in FIG. 2D) to facilitate data communications for subscribers (e.g., using User Equipment (UE), such as smart phones, laptops, computers (which may be in a fixed location), and/or other cellular enabled computing devices/equipment, such as CIoT devices, or other network communication enabled devices) to access various applications, web services, content hosts, etc. and/or other networks.

As shown in FIG. 2D, the 4G network access mechanisms 204 are in communication with User Plane network elements including a Serving Gateway (SGW) and a Packet Gateway (PGW) for the User Plane traffic shown as SGW-U 208 and PGW-U 206, respectively. A Security Platform 202b is located between PGW-U 206 and a Traffic Detection Function for the User Plane Traffic shown as TDF-U 224, which passes through Security Platform 202b to communicate with TDF-U 224.

As also shown in FIG. 2D, the 4G network access mechanisms 204 are in communication (e.g., via an Sxa/Sxb interfaces) with a Core Network 210, which passes through Security Platform 202a to access Core Network 210 for the Control Plane traffic. Core Network 210 includes Control Plane network elements including a Serving Gateway (SGW) and a Packet Data Network (PDN) Gateway (PGW) for the Control Plane traffic shown as SGW-C 218 and PGW-C 216, respectively. Core Network 210 also includes a Traffic Detection Function for the Control Plane Traffic shown as TDF-C 234, which passes through Security Platform 202b as shown. Specifically, the Sxa interface provides an interface between PGW-C 216 and PGW-U 206 via PFCP over UDP, and the Sxb interface provides an interface between SGW-C 218 and SGW-U 208 via PFCP over UDP. As also shown, the Sxc interface provides an interface between TDF-C 234 and TDF-U 224 via PFCP over UDP.

As also shown, Security Platform 202a (e.g., and other Security Platforms can similarly be in communication with the security cloud service) is also in network communication with a security service 222 (e.g., a commercially available cloud-based security service, such as the WildFire™ (WF) cloud-based malware analysis environment that is a commercially available cloud security service provided by Palo Alto Networks, Inc., which includes automated security analysis of malware samples as well as security expert analysis, or a similar solution provided by another vendor can be utilized), such as for dynamic prevention signatures for malware, DNS, URL, command and control (C&C), and/or various other security updates and/or cloud-based malware samples analysis.

Referring to FIG. 2D, network traffic communications can be monitored using Security Platforms 202a and 202b (e.g., which can be located in various locations to monitor Sxa, Sxb, Sxc, and/or other communications) as similarly described above with respect to FIGS. 2A-C and as further described below. In this example implementation, Security Platforms 202a and 202b are located in this example 4G mobile network environment for monitoring and parsing PFCP messages (e.g., PFCP over UDP) on an Sxa interface between PDN Gateway-C shown at 216 and PDN Gateway-U shown at 206, an Sxb interface between Serving Gateway-C shown at 218 and Serving Gateway-U shown at 208, and an Sxc interface between TDF-C as shown at 234 and TDF-U as shown at 224 to extract certain information used to setup PFCF sessions and to keep track of control message flow as will be further described below.

As will now be apparent, network traffic communications can be monitored/filtered using one or more security platforms for network traffic communications in various locations within a 4G network and/or a 5G network (e.g., 5G network or converged 5G network) to facilitate securing control and user plane separation in mobile networks.

Example Security Mechanisms Based on Monitoring PFCP Traffic for Securing Control and User Plane Separation in Mobile Networks As similarly discussed above, PFCP shall be used on the interface between control plane and user plane functions as specified in 3GPP Technical Specification (TS) 29.244 v15.7 for the LTE; 5G; Interface between the Control Plane and the User Plane nodes (e.g., and later releases/versions).

Figure 3A:
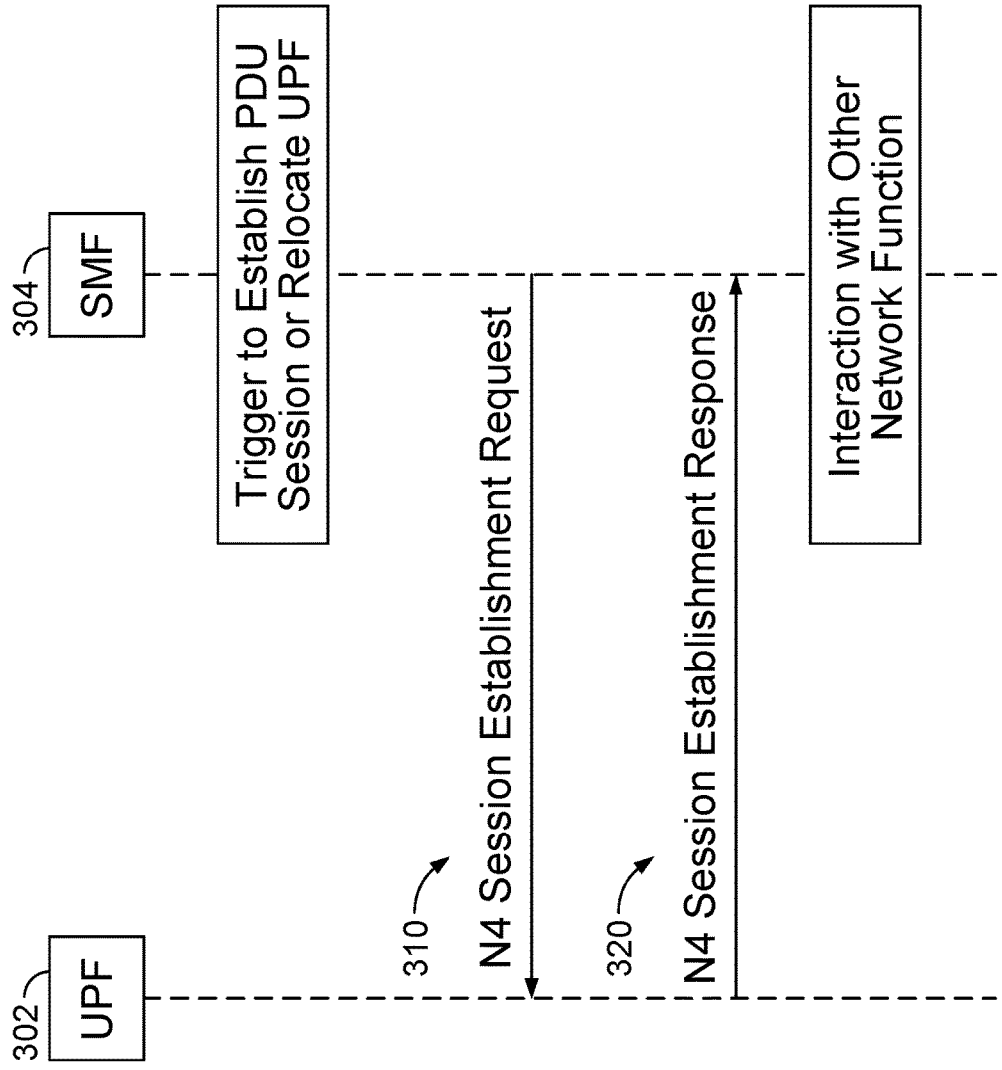
FIG. 3A is a protocol sequence diagram for a PFCP session establishment procedure.

FIG. 3A is a protocol sequence diagram for a PFCP session establishment procedure. Referring to FIG. 3A, SMF 304 receives the trigger to establish a new PDU session or change the UPF for an established PDU session. At 310, SMF 304 sends an N4 session establishment request message to UPF 302. At 320, UPF 302 responds with an N4 session establishment response message. SMF 304 interacts with the network function that triggered this procedure (e.g. a 5G Core Access and Mobility Management Function (AMF) or a Policy Control Function (PCF)).

FIG. 3B is a protocol sequence diagram for a PFCP session modification procedure. Referring to FIG. 3B, SMF 304 receives the trigger to modify an existing PDU session. At 330, SMF 304 sends an N4 session modification request message to UPF 302. At 340, UPF 302 responds with an N4 session modification response message. SMF 304 interacts with the network function that triggered this procedure (e.g. AMF or PCF).

Figure 3C:
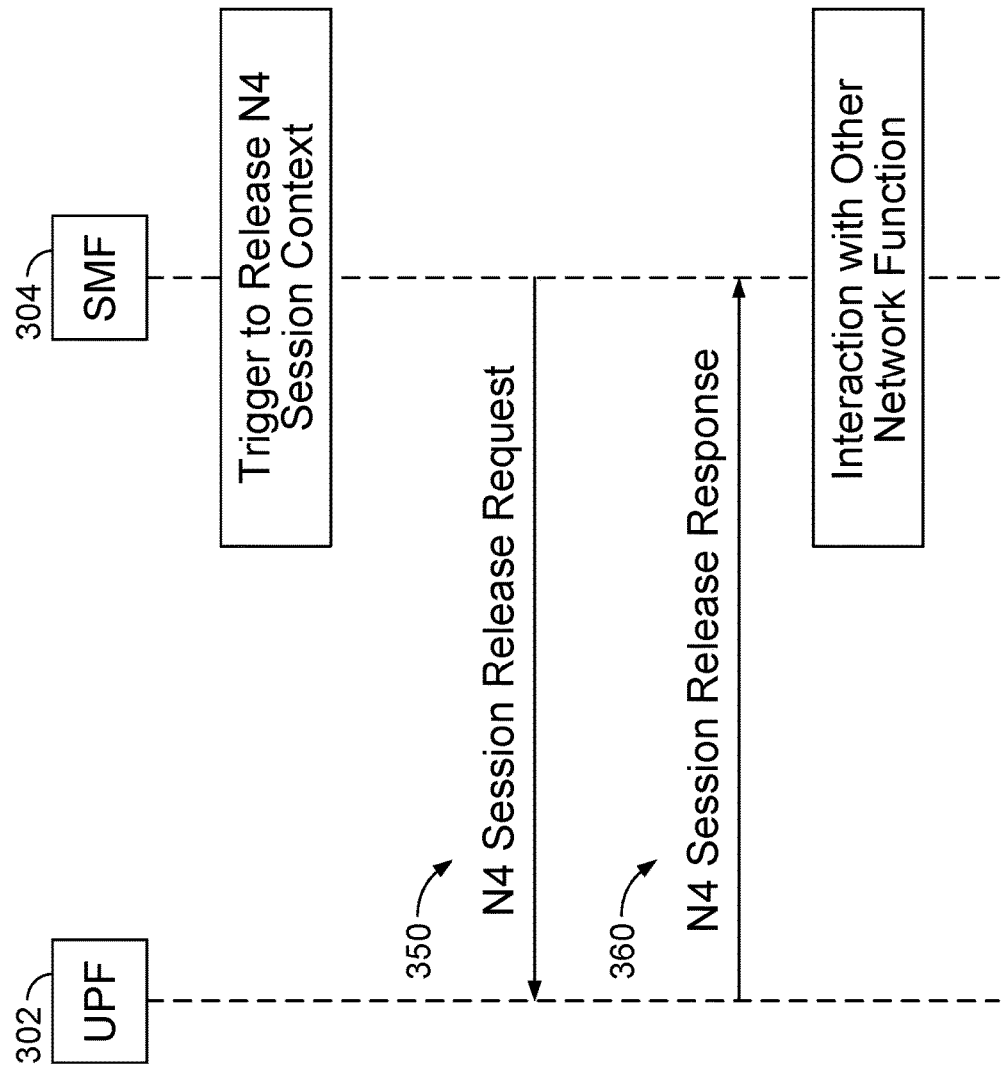
FIG. 3C is a protocol sequence diagram for a PFCP session release procedure.

FIG. 3C is a protocol sequence diagram for a PFCP session release procedure. Referring to FIG. 3C, SMF 304 receives the trigger to remove the N4 session context for the PDU Session. At 350, SMF 304 sends an N4 session release request message to UPF 302. UPF 302 identifies the N4 session context to be removed by the N4 Session ID and removes the whole session context. At 360, UPF 302 responds with an N4 session release response message (e.g., including any information that the UPF has to provide to the SMF). SMF 304 interacts with the network function that triggered this procedure (e.g. AMF or PCF).

In an example implementation, based on a Security Platforms deployment topology in multi-access distributed edge 4G/5G network or an enterprise private LTE network (e.g., such as the Security Platforms deployments shown in FIG. 1 and also in FIGS. 2A-D), the PFCF stateful inspection can be performed as described below.

First, using the Security Platform to monitor PFCP traffic, the Security Platform automatically builds sessions based on a 5-tuple+Node ID (optional) related to a PFCP association (e.g., the 5-tuple can include the following parameters: a source IP address, SEID 1, a destination IP address, SEID 2, and the protocol in use, which is PFCP in this example), such as will be further described below.

Second, the Security Platform is configured with a security policy to only allow PFCP session related messages from a Control Plane (CP) or a User Plane (UP) function matching an 'ACTIVE' session corresponding to an existing PFCP association.

Third, using the Security Platform to monitor PFCP traffic, the Security Platform can automatically build a PFCP session state machine to track the following states: create, update, and release of PFCP sessions based on the 5-tuple (e.g., the 5-tuple can include the following parameters: a source IP address, SEID 1, a destination IP address, SEID 2, and the protocol in use, which is PFCP in this example), such as will be further described below with respect to FIGS. 3A-C.

Fourth, the Security Platform is configured with a security policy to perform a sequence number check. For example, the Security Platform can check the sequence number in PFCP request and response messages. In this example, the Security Platform is configured with a security policy to only allow PFCP response messages with sequence numbers matching PCFP request messages (e.g., as specified in 3GPP TS 29.244 v15.7.0 at section 6.4—a PCFP request and its response message shall have the same sequence number value).

The Security Platform can be configured to perform additional security mechanisms based on monitoring PFCP traffic. Various examples of such additional security mechanisms based on monitoring PFCP traffic will now be described.

For example, the Security Platform can be configured with a security policy to perform a User Plane IP Resource Information check. Specifically, additional security on a CUPS interface can be applied by checking the 'user plane IP resource information' exchanged between a User Plane (UP) and Control Plane (CP) function. During the PFCP association setup procedure, a 'PFCP Association Setup Request' message can optionally include an information element (IE) for 'user plane IP resource information' that shall contain an IPv4 and/or an IPv6 address, together with a TEID range that the CP function shall use to allocate GTP-U F-TEID in the UP function during the PFCP association setup. In this example, the Security Platform can be configured with a security policy to store this information and only allow setup of GTP-U tunnels matching the valid range of GTP-U F-TEID with the correct IPv4 and/or IPv6 address exchanged earlier during the PFCP association setup.

As another example, the Security Platform can be configured with a security policy to perform overload protection—rate limiting of PFCP messages. Specifically, the Security Platform can be configured with a security policy to monitor a PFCP association setup request, a PFCP session establishment request, and a PFCP session deletion request, such as described above with respect to FIGS. 3A-C, which can be applied by the Security Platform to protect resources of various network functions in the 4G/5G network, such as the UPF, PGW-U, and/or other network functions in the 4G/5G network.

Example Use Cases of Enhanced Security for Securing Control and User Plane Separation in Mobile Networks The disclosed techniques for providing enhanced security for 4G/5G mobile/service provider networks using a security platform for security policy enforcement, including for securing control and user plane separation in mobile networks, can be applied in a variety of additional example use case scenarios for facilitating enhanced security for 4G/5G mobile/service provider network environments.

In an example use case scenario, PFCP protocol runs over UDP and lacks an inherently secure design. As such, the mobile network can be subject to attacks, such as Denial of Service (DoS) and/or spoofing attacks.

An example potential attack can target one or more network functions including UPF and/or SMF network functions receiving PFCP messages for Session Endpoint Identifier (SEID) brute forcing (e.g., 0 or a fake SEID).

Another example potential attack can target network functions including UPF and/or SMF network functions receiving spoofed PFCP messages with a fake PFCP session modification request and/or a PFCP session deletion request.

Yet another example potential attack can target PFCP node discovery in which an attacker with access to an Sxa/Sxb/N4 interface (e.g., or other interfaces) can send valid PFCP messages to a Network Function (NF) and receive a response message with useful information about the NF (e.g., such information can then be used by the attacker to launch an attack on the 4G/5G mobile network).

The disclosed potential attack examples can be detected and/or prevented using the disclosed techniques as will be described below.

DoS attacks on UPF and/or SMF using brute force 0 or fake SEID can be detected and prevented using PFCP stateful inspection performed by the security platform as similarly described above. DoS attacks and/or spoofing attacks on UPF and/or SMF can also be detected and prevented by configuring appropriate thresholds to rate limit PFCP messages in a security policy enforced by the security platform as similarly described above.

Spoofing and/or session/association hijacking attacks on UPF and/or SMF using fake PFCP session modification requests and/or a PFCP session deletion requests can be detected and prevented using PFCP stateful inspection. Specifically, as the security platform maintains the state of PFCP association, only valid PFCP association messages matching existing PFCP association in a firewall table can be allowed based on a security policy enforced by the security platform as similarly described above. Similarly, as the security platform maintains the state of a PFCP session, only valid PFCP session messages matching an existing PFCP session in a firewall table can be allowed based on a security policy enforced by the security platform as similarly described above.

Finally, reconnaissance attacks using PFCP messages to collect network function information can be detected and prevented using both PFCP stateful inspection and PFCP message rate limit based on a security policy enforced by the security platform as similarly described above.

As will now be apparent to one of ordinary skill in the art, the disclosed techniques for providing enhanced security for 4G/5G mobile/service provider networks using a security platform for security policy enforcement, including for securing control and user plane separation in mobile networks, can be applied in a variety of additional example use case scenarios to detect/prevent these and other types of attacks for facilitating enhanced security for 4G/5G mobile/service provider network environments.

Figure 4:
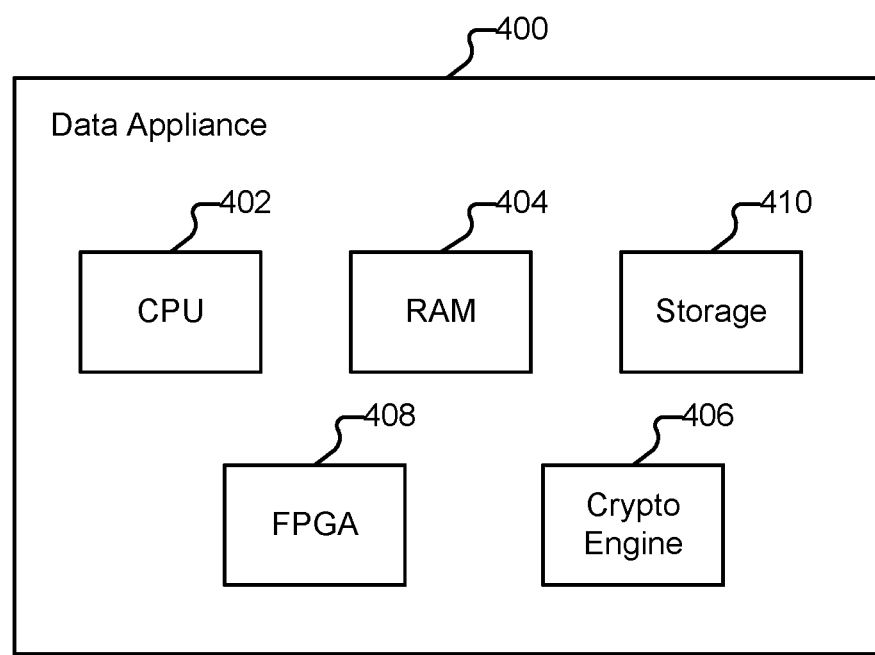
FIG. 4 is a functional diagram of hardware components of a network device for securing control and user plane separation in mobile networks in accordance with some embodiments.

Example Hardware Components of a Network Device for Securing Control and User Plane Separation in Mobile Networks FIG. 4 is a functional diagram of hardware components of a network device for securing control and user plane separation in mobile networks in accordance with some embodiments. The example shown is a representation of physical/hardware components that can be included in network device 400 (e.g., an appliance, gateway, or server that can implement the security platform disclosed herein). Specifically, network device 400 includes a high performance multi-core CPU 402 and RAM 404. Network device 400 also includes a storage 410 (e.g., one or more hard disks or solid state storage units), which can be used to store policy and other configuration information as well as signatures. In one embodiment, storage 410 stores certain information (e.g., a 5-tuple+Node ID (optional) related to a PFCP association, PFCP session state information for tracking the following states: create, update, and release of PFCP sessions based on the 5-tuple+SEID, sequence numbers in PFCP request and response messages, etc.) that is extracted from PFCP traffic over various interfaces that are monitored for implementing the disclosed security policy enforcement techniques for securing control and user plane separation in mobile networks using a security platform(s) as similarly described above with respect to FIGS. 1-3C. Network device 400 can also include one or more optional hardware accelerators. For example, network device 400 can include a cryptographic engine 406 configured to perform encryption and decryption operations, and one or more FPGAs 408 configured to perform signature matching, act as network processors, and/or perform other tasks.

Figure 5:
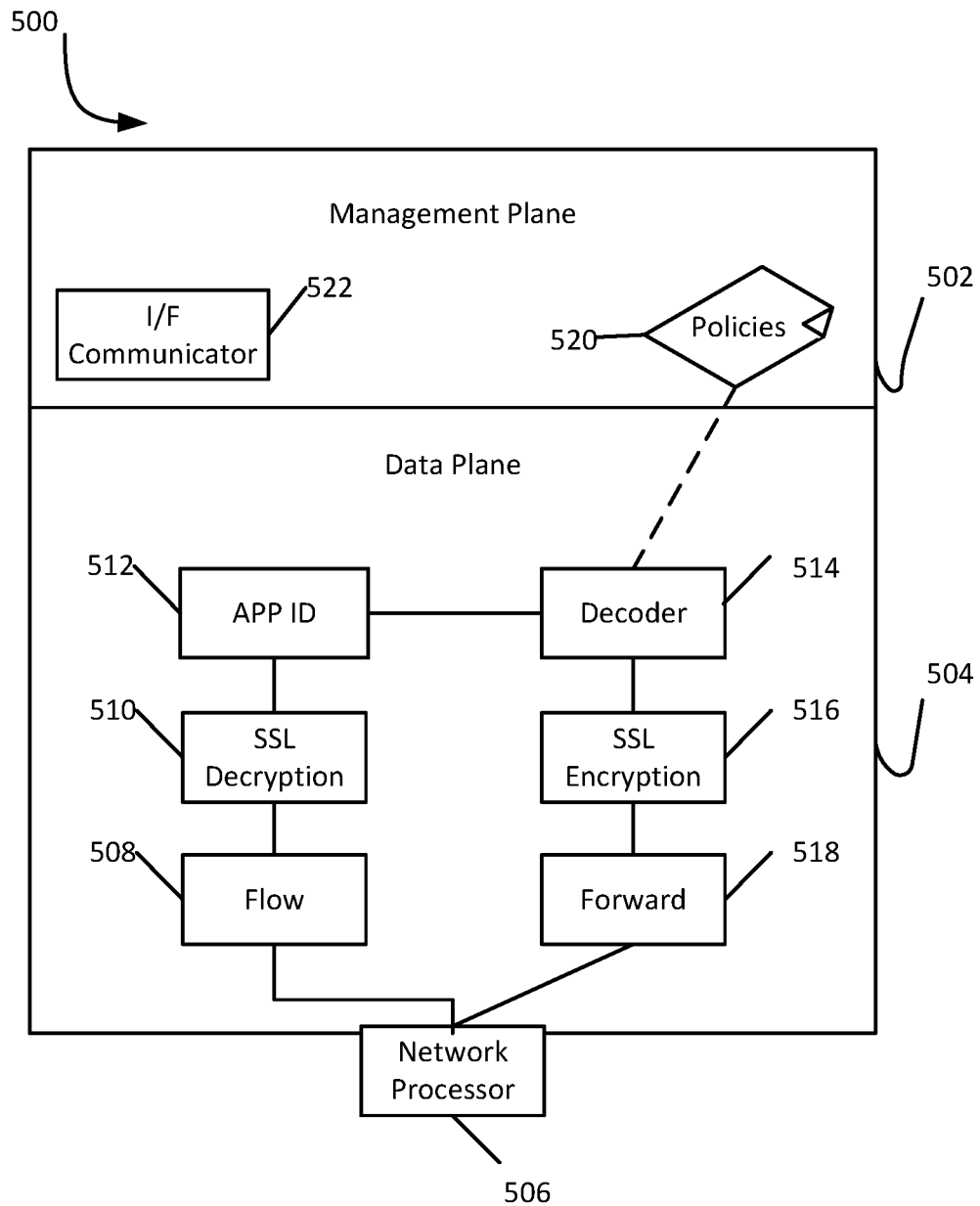
FIG. 5 is a functional diagram of logical components of a network device for securing control and user plane separation in mobile networks in accordance with some embodiments.

Example Logical Components of a Network Device for Securing Control and User Plane Separation in Mobile Networks FIG. 5 is a functional diagram of logical components of a network device for securing control and user plane separation in mobile networks in accordance with some embodiments. The example shown is a representation of logical components that can be included in network device 500 (e.g., a data appliance, which can implement the disclosed security function/platform and perform the disclosed techniques for securing control and user plane separation in mobile networks). As shown, network device 500 includes a management plane 502 and a data plane 504. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an MEC service, an IoT device such as a CIoT device, or another resource) using an encrypted session protocol, such as SSL. Network processor 506 is configured to monitor packets from the mobile device, and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decryption engine 510 using various techniques as described herein. Otherwise, processing by SSL decryption engine 510 is omitted. Application identification (APP ID) module 512 is configured to determine what type of traffic the session involves (e.g., PFCP over UDP traffic between various monitored interfaces as similarly described above with respect to FIGS. 1-3C) and to identify a user associated with the traffic flow (e.g., to identify an Application-ID as described herein). For example, APP ID 512 can recognize a GET request in the received data and conclude that the session requires an HTTP decoder 514. As another example, APP ID 512 can recognize PFCP session establishment/modification/release messages (e.g., N4 session establishment request/response messages, such as similarly described above with respect to FIGS. 3A-C) and conclude that the session requires a PFCP decoder (e.g., to extract information exchanged in the N4 session establishment related messages including various parameters, such as similarly described above with respect to FIGS. 1-3C). For each type of protocol, there exists a corresponding decoder 514. In one embodiment, the application identification is performed by an application identification module (e.g., APP ID component/engine), and a user identification is performed by another component/engine. Based on the determination made by APP ID 512, the packets are sent to an appropriate decoder 514. Decoder 514 is configured to assemble packets (e.g., which may be received out of order) into the correct order, perform tokenization, and extract out information (e.g., such to extract various information exchanged in the N4 session establishment related messages and/or various PFCP messages over N4/Sxa/Sxb/Sxc/other interfaces as similarly described above and further described below). Decoder 514 also performs signature matching to determine what should happen to the packet. SSL encryption engine 516 performs SSL encryption using various techniques as described herein and the packets are then forwarded using a forward component 518 as shown. As also shown, policies 520 are received and stored in the management plane 502. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored HTTP/2 messages and/or DPI of monitored PFCP and/or other protocol(s) traffic as disclosed herein) is applied as described herein with respect to various embodiments based on the monitored, decrypted, identified, and decoded session traffic flows.

As also shown in FIG. 5, an interface (I/F) communicator 522 is also provided for security platform manager communications (e.g., via (REST) APIs, messages, or network protocol communications or other communication mechanisms). In some cases, network communications of other network elements on the service provider network are monitored using network device 500, and data plane 504 supports decoding of such communications (e.g., network device 500, including I/F communicator 522 and decoder 514, can be configured to monitor and/or communicate on, for example, reference point interfaces such as N4, Sxa, Sxb, Sxc, and/or other interfaces where wired and wireless network traffic flow exists). As such, network device 500 including I/F communicator 522 can be used to implement the disclosed techniques for security policy enforcement on mobile/service provider network environments, including MEC services security, as described above and as will be further described below.

Additional example processes for the disclosed techniques for securing control and user plane separation in mobile networks will now be described.

Figure 6:
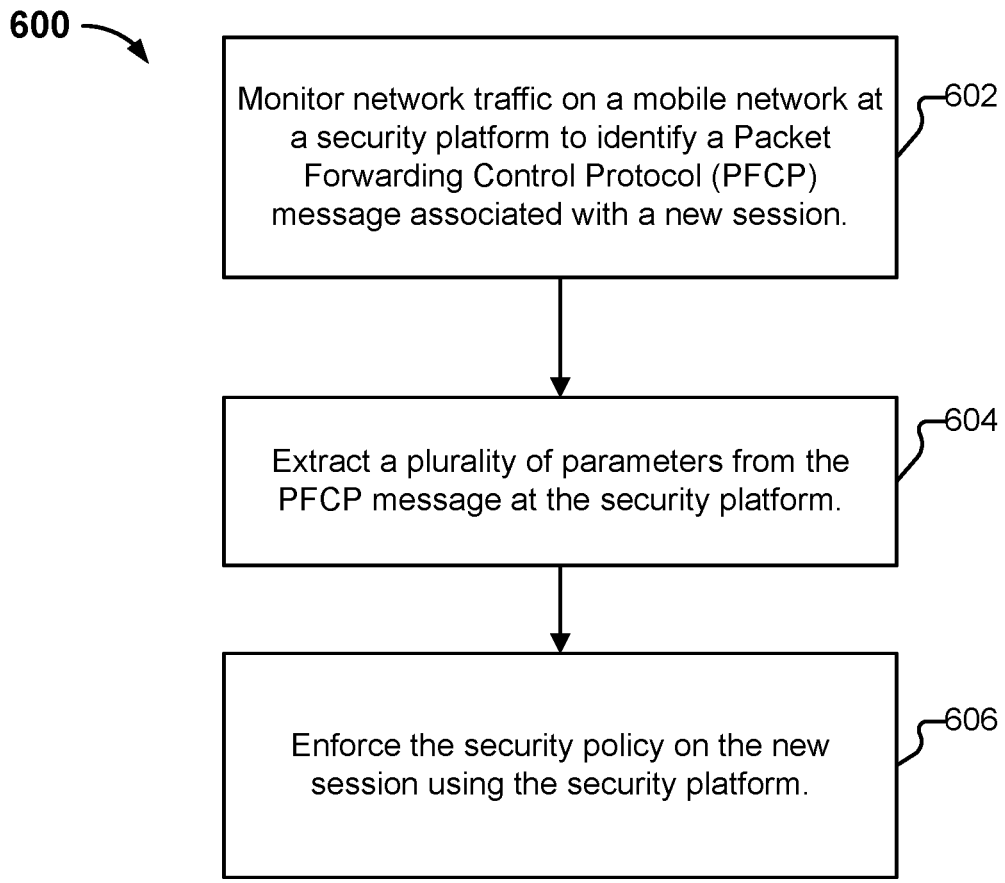
FIG. 6 is a flow diagram of a process for securing control and user plane separation in mobile networks in accordance with some embodiments.

Example Processes for Securing Control and User Plane Separation in Mobile Networks FIG. 6 is a flow diagram of a process for securing control and user plane separation in mobile networks in accordance with some embodiments. In some embodiments, a process 600 as shown in FIG. 6 is performed by the security platform and techniques as similarly described above including the embodiments described above with respect to FIGS. 1-5. In one embodiment, process 600 is performed by data appliance 400 as described above with respect to FIG. 4, network device 500 as described above with respect to FIG. 5, a virtual appliance, an SDN security solution, a cloud security service, and/or combinations or hybrid implementations of the aforementioned as described herein.

The process begins at 602. At 602, monitoring network traffic on a mobile network at a security platform to identify a Packet Forwarding Control Protocol (PFCP) message associated with a new session is performed, in which the mobile network includes a 4G network or a 5G network. For example, the security platform (e.g., a firewall, a network sensor acting on behalf of the firewall, or another device/component that can implement security policies) can monitor, in some cases, various protocols, such as PFCP traffic and/or other protocols, on the mobile network and, more specifically, by performing the disclosed techniques can monitor various interfaces, such as the N4, Sxa, Sxb, and Sxc interfaces, as similarly described above.

At 604, extracting a plurality of parameters from the PFCP message at the security platform is performed. For example, the security platform can parse the PFCP message to extract a source IP address, SEID 1, a destination IP address, SEID 2, and the protocol in use related to a PFCP association as similarly described above. As another example, the security platform can parse the PFCP message to extract a Node ID related to a PFCP association as similarly described above.

At 606, enforcing a security policy at the security platform on the new session based on one or more of the plurality of parameters to secure control and user plane separation in the mobile network is performed. For example, detection and prevention of Denial of Service (DoS) attacks for securing control and user plane separation in 4G/5G networks can be performed by the security platform as similarly described above. As another example, detection and prevention of Session Endpoint Identifier (SEID) Spoofing attacks for securing control and user plane separation in 4G/5G networks can be performed by the security platform as similarly described above.

Figure 7:
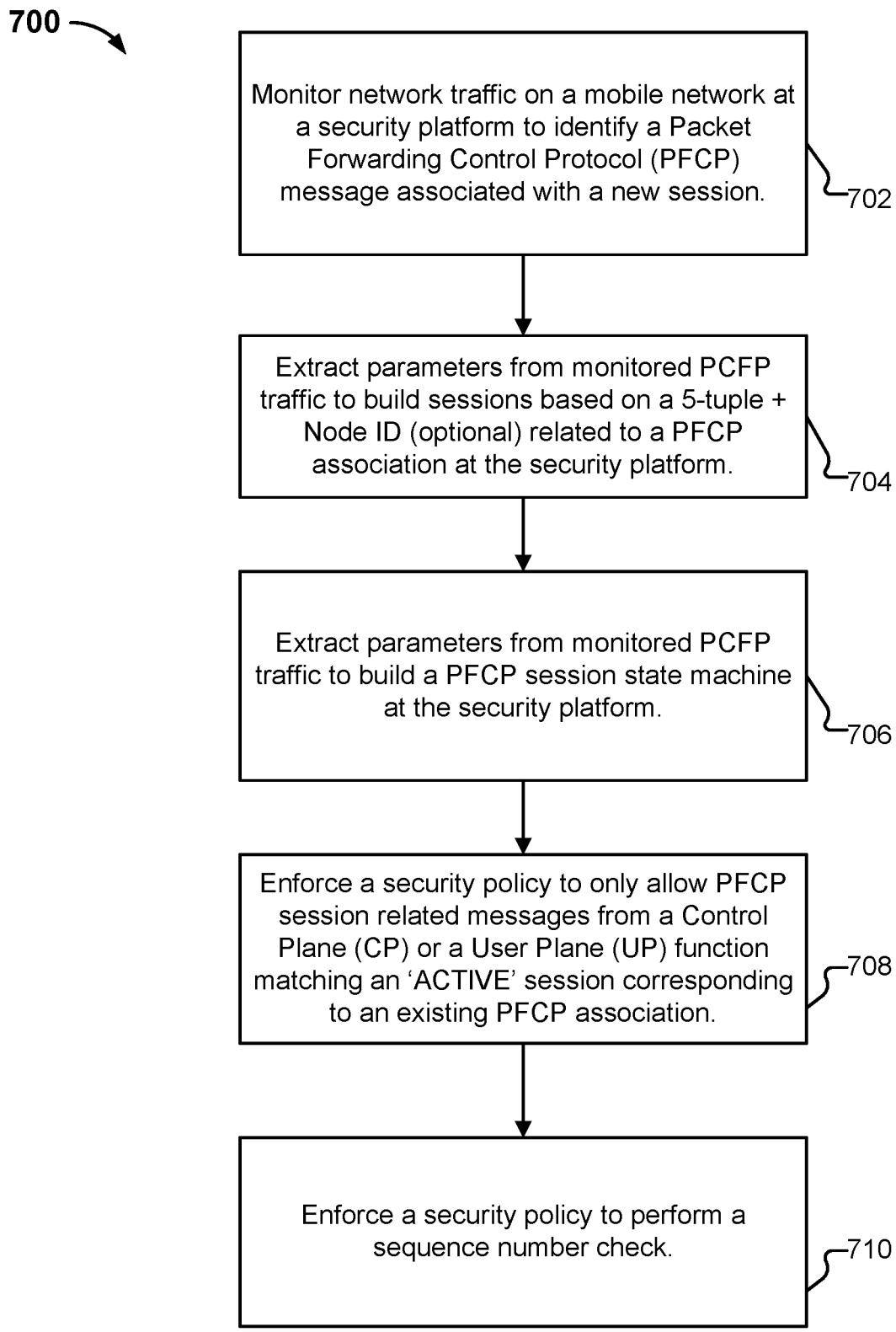
FIG. 7 is another flow diagram of a process for securing control and user plane separation in mobile networks in accordance with some embodiments.

FIG. 7 is another flow diagram of a process for securing control and user plane separation in mobile networks in accordance with some embodiments. In some embodiments, a process 700 as shown in FIG. 7 is performed by the security platform and techniques as similarly described above including the embodiments described above with respect to FIGS. 1-5. In one embodiment, process 700 is performed by data appliance 400 as described above with respect to FIG. 4, network device 500 as described above with respect to FIG. 5, a virtual appliance, an SDN security solution, a cloud security service, and/or combinations or hybrid implementations of the aforementioned as described herein.

At 702, monitoring network traffic on a mobile network at a security platform to identify a Packet Forwarding Control Protocol (PFCP) message associated with a new session is performed, in which the mobile network includes a 4G network or a 5G network. For example, the security platform (e.g., a firewall, a network sensor acting on behalf of the firewall, or another device/component that can implement security policies) can monitor, in some cases, various protocols, such as PFCP traffic and/or other protocols, on the mobile network and, more specifically, by performing the disclosed techniques can monitor various interfaces, such as the N4, Sxa, Sxb, and Sxc interfaces, as similarly described above.

At 704, extracting parameters from monitored PCFP traffic to build sessions based on a 5-tuple+Node ID (optional) related to a PFCP association (e.g., the 5-tuple can include the following parameters: a source IP address, SEID 1, a destination IP address, SEID 2, and the protocol in use, which is PFCP in this example) at the security platform is performed, such as similarly described above.

At 706, extracting parameters from monitored PCFP traffic to build a PFCP session state machine at the security platform is performed. For example, the security platform can track the following states: create, update, and release of PFCP sessions based on the 5-tuple+SEID, such as similarly described above.

At 708, enforcing a security policy at the security platform to only allow PFCP session related messages from a Control Plane (CP) or a User Plane (UP) function matching an 'ACTIVE' session corresponding to an existing PFCP association is performed, such as similarly described above.

At 710, enforcing a security policy at the security platform to perform a sequence number check is performed. For example, the security platform can check the sequence number in PFCP request and response messages. In this example, the security platform is configured with a security policy to only allow PFCP response messages with sequence numbers matching PCFP request messages (e.g., as specified in 3GPP TS 29.244 v15.7.0 at section 6.4—a PCFP request and its response message shall have the same sequence number value), such as similarly described above.

As will now be apparent in view of the disclosed embodiments, a network service provider/mobile operator (e.g., a cellular service provider entity), a device manufacturer (e.g., an automobile entity, IoT device entity, and/or other device manufacturer), and/or system integrators can specify such security policies that can be enforced by a security platform using the disclosed techniques to solve these and other technical network security challenges for securing control and user plane separation in mobile networks, including 4G networks and 5G networks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic on a mobile network at a security platform to identify a Packet Forwarding Control Protocol (PFCP) message associated with a new session, wherein the mobile network includes a 4G network or a 5G network;
extract parameters from monitored PCFP traffic to build sessions based on a 5-tuple related to a PFCP association at the security platform, comprising to:
parse a PFCP message of the monitored PCFP traffic to extract a Node ID, a source IP address, Session Endpoint Identifier (SEID) 1, a destination IP address, SEID 2, and the protocol in use related to a PFCP association;
extract parameters from the monitored PFCP traffic to build a PFCP session state machine at the security platform;
enforce a security policy to only allow PFCP session related messages from a control plane (CP) to a user plane (UP) function matching an 'ACTIVE' session corresponding to an existing PFCP association; and
enforce a security policy to perform a sequence number check, wherein the enforcing of the security policy to perform the sequence number check comprises to:
check a sequence number in a PFCP request message and a sequence number in a PFCP response message; and
a memory coupled to the processor and configured to provide the processor with instructions.

2. The system recited in claim 1, wherein the parameters extracted from the monitored PCFP traffic include a source IP address, Session Endpoint Identifier (SEID) 1, a destination IP address, SEID 2, and the protocol in use.

3. The system recited in claim 1, wherein the security platform is configured to perform detection and prevention of spoofing and/or session/association hijacking attacks.

4. The system recited in claim 1, wherein the processor is further configured to:
block the new session from accessing a resource based on the security policy.

5. The system recited in claim 1, wherein the processor is further configured to:
allow the new session to access a resource based on the security policy.

6. A method, comprising:
monitoring network traffic on a mobile network at a security platform to identify a Packet Forwarding Control Protocol (PFCP) message associated with a new session, wherein the mobile network includes a 4G network or a 5G network;
extracting parameters from monitored PCFP traffic to build sessions based on a 5-tuple related to a PFCP association at the security platform, comprising:
parsing a PFCP message of the monitored PCFP traffic to extract a Node ID, a source IP address, Session Endpoint Identifier (SEID) 1, a destination IP address, SEID 2, and the protocol in use related to a PFCP association;
extracting parameters from the monitored PFCP traffic to build a PFCP session state machine at the security platform;
enforcing a security policy to only allow PFCP session related messages from a control plane (CP) to a user plane (UP) function matching an active session corresponding to an existing PFCP association; and
enforcing a security policy to perform a sequence number check, wherein the enforcing of the security policy to perform the sequence number check comprises:
checking a sequence number in a PFCP request message and a sequence number in a PFCP response message.

7. The method of claim 6, wherein the parameters extracted from the monitored PCFP traffic include a source IP address, Session Endpoint Identifier (SEID) 1, a destination IP address, SEID 2, and the protocol in use.

8. The method of claim 6, wherein the security platform is configured to perform detection and prevention of spoofing and/or session/association hijacking attacks.

9. The method of claim 6, further comprising:
blocking the new session from accessing a resource based on the security policy.

10. The method of claim 6, further comprising:
allowing the new session to access a resource based on the security policy.

11. A computer program product, the computer program product being embodied in a non-transitory computer readable storage medium and comprising computer instructions for:
- monitoring network traffic on a mobile network at a security platform to identify a Packet Forwarding Control Protocol (PFCP) message associated with a new session, wherein the mobile network includes a 4G network or a 5G network;
- extracting parameters from monitored PCFP traffic to build sessions based on a 5-tuple related to a PFCP association at the security platform, comprising:
- parsing a PFCP message of the monitored PCFP traffic to extract a Node ID, a source IP address, Session Endpoint Identifier (SEID) 1, a destination IP address, SEID 2, and the protocol in use related to a PFCP association;
- extracting parameters from the monitored PFCP traffic to build a PFCP session state machine at the security platform;
- enforcing a security policy to only allow PFCP session related messages from a control plane (CP) to a user plane (UP) function matching an active session corresponding to an existing PFCP association; and
- enforcing a security policy to perform a sequence number check, wherein the enforcing of the security policy to perform the sequence number check comprises:
- checking a sequence number in a PFCP request message and a sequence number in a PFCP response message.

* * * * *